United States Patent
Smyth et al.

(10) Patent No.: US 8,095,290 B2
(45) Date of Patent: Jan. 10, 2012

(54) METHOD TO CONTROL VEHICULAR POWERTRAIN BY MONITORING MAP PREVIEW INFORMATION

(75) Inventors: John Gary Smyth, Rochester Hills, MI (US); Tang-Wei Kuo, Troy, MI (US); Man-Feng Chang, Troy, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 831 days.

(21) Appl. No.: 12/184,380

(22) Filed: Aug. 1, 2008

(65) Prior Publication Data

US 2010/0030447 A1   Feb. 4, 2010

(51) Int. Cl.
 *F02D 45/00* (2006.01)
 *F02B 9/04* (2006.01)

(52) U.S. Cl. .......................... 701/102; 701/25
(58) Field of Classification Search ............ 701/102, 701/202, 56, 51, 22, 25, 110, 115
See application file for complete search history.

(56) References Cited

U.S. PATENT DOCUMENTS

| | | | |
|---|---|---|---|
| 6,609,492 B2 | 8/2003 | Naik | |
| 6,911,906 B2 * | 6/2005 | Satou | 340/500 |
| 7,107,107 B2 * | 9/2006 | Morikawa et al. | 700/31 |
| 7,181,902 B2 | 2/2007 | Naik | |
| 7,181,908 B2 | 2/2007 | Naik | |
| 7,367,308 B2 | 5/2008 | Kuo et al. | |
| 7,367,313 B2 | 5/2008 | Chang et al. | |
| 7,370,616 B2 | 5/2008 | Kuo et al. | |
| 7,370,633 B2 | 5/2008 | Kang et al. | |
| 7,401,462 B2 | 7/2008 | Naik et al. | |
| 7,478,620 B2 | 1/2009 | Kuo et al. | |
| 2008/0271688 A1 | 11/2008 | Wermuth et al. | |

FOREIGN PATENT DOCUMENTS

JP   2003156341 A * 5/2003

OTHER PUBLICATIONS

U.S. Appl. No. 12/024,593, filed Feb. 1, 2008, Cleary et al.
Chen, J., Speed and acceleration filters/estimators for powertrain and vehicle controls, SAE International, SAE-2007-01-1599, 2007, Detroit, Michigan, USA.

* cited by examiner

*Primary Examiner* — Hieu T Vo

(57) ABSTRACT

A method of operating a vehicular powertrain including an internal combustion engine includes monitoring map preview information, determining a projected vehicle path based upon the map preview information, determining likely engine operation demands along the projected vehicle path, wherein the likely engine operation demands include likely required engine speeds and likely required engine loads, determining selectable engine operating modes at each likely engine operating demand, and executing engine operation based upon the selectable engine operating modes.

19 Claims, 6 Drawing Sheets

METHOD TO CONTROL VEHICULAR POWERTRAIN BY MONITORING MAP PREVIEW INFORMATION

TECHNICAL FIELD

This disclosure is related to vehicle powertrain control.

BACKGROUND

The statements in this section merely provide background information related to the present disclosure and may not constitute prior art.

Fuel efficiency and emission control are important factors in modern vehicle design and control strategies. A number of strategies have been developed to enhance vehicle performance to improve these factors, including but not limited to hybrid energy usage, alternative engine control strategies, adjusting shift schedules, and utilizing various aftertreatment strategies. These strategies collectively strive to reduce fuel consumption and control undesirable by-products expelled from the vehicle as exhaust.

Known powertrain architectures utilizing hybrid energy sources include torque-generative devices, including internal combustion engines and electric machines, which transmit torque through a transmission device to an output member. One exemplary powertrain includes a two-mode, compound-split, electromechanical transmission which utilizes an input member for receiving motive torque from a prime mover power source, preferably an internal combustion engine, and an output member. The output member can be operatively connected to a driveline for a motor vehicle for transmitting tractive torque thereto. Electric machines, operative as motors or generators, generate a torque input to the transmission, independently of a torque input from the internal combustion engine. The electric machines may transform vehicle kinetic energy, transmitted through the vehicle driveline, to electrical energy that is storable in an electrical energy storage device. A control system monitors various inputs from the vehicle and the operator and provides operational control of the powertrain, including controlling transmission operating state and gear shifting, controlling the torque-generative devices, and regulating the electrical power interchange among the electrical energy storage device and the electric machines to manage outputs of the transmission, including torque and rotational speed. Strategies for balancing the different highly efficient operation under electrical power and high output operation under combustion are known, and these balancing strategies allow for flexibility through different operating conditions. Through modulation of the various components of the powertrain, the vehicle can take advantage of operating conditions especially beneficial to particular modes of operation, reclaim kinetic energy as potential energy, and store that potential energy in an energy storage device, thereby allowing storage and later low or zero emission use of energy that would normally be dissipated through vehicle braking.

Engine control strategies utilized to enhance vehicle performance take many forms. New engine mechanisms provide means to increase efficiency. For example, active fuel management including cylinder deactivation is known wherein a vehicle control system determines a required torque input from the engine, and only utilizes the proportion of cylinders in the engine necessary to efficiently deliver that torque. Another example includes enhanced engine valve operation, for instance, variable lift valves, enabling unthrottled operation controlling air intake by the opening of the valves, thereby reducing pumping losses associated with throttled operation. Also, variable valve timing in combination with variable spark timing and enabling engine control mechanisms allow manipulation of the combustion cycle to match optimal combustion for particular operating conditions. Additionally, advanced engines include a variety of control strategies, for example, taking advantage of in-cylinder pressure sensing and high speed processing to optimize and adjust combustion from cycle to cycle. Additionally, new combustion processes provide flexible combustion parameters with different optimal ranges. Combustion within conventional gasoline and diesel engines was long performed at stoichiometric and lean fuel air ratio, respectively, providing a mixture of the two chemical components (fuel and oxidizer) necessary to sustain a desired combustion reaction. Other combustion processes are known, for example, homogeneous charge compression ignition (HCCI), pre-mixed charge compression ignition (PCCI) and stratified charge spark ignition direct-injection (stratified-charge SIDI), by taking advantage of unconventional charge concentrations, charge mixtures, and ignition methods to more efficiently extract energy from the charge. Each of the above improvements to engine control strategies are highly dependent upon vehicle operating conditions, such as engine speed and engine load.

Each combustion process includes ranges and conditions necessary or favorable to efficient operation. For example, HCCI combustion requires an internal combustion engine designed to operate under an Otto cycle. The engine, equipped with direct in-cylinder fuel-injection, operates in a controlled auto-ignition mode under specific engine operating conditions to achieve improved engine fuel efficiency. A spark ignition system is employed to supplement the auto-ignition combustion process during specific operating conditions.

An HCCI engine operating in HCCI combustion mode creates a charge mixture of combusted gases, air, and fuel in a combustion chamber, and auto-ignition is initiated simultaneously from many ignition sites within the charge mixture during a compression stroke, resulting in stable power output, high thermal efficiency and low emissions. The combustion is highly diluted and uniformly distributed throughout the charge mixture, resulting in low burnt gas temperature and NOx emissions typically substantially lower than NOx emissions of either a traditional spark ignition engine, or a traditional diesel engine.

HCCI has been demonstrated in two-stroke gasoline engines using conventional compression ratios. It is believed that the high proportion of burnt gases remaining from the previous cycle, i.e., the residual content, within the two-stroke engine combustion chamber is responsible for providing the high mixture temperature necessary to promote auto-ignition in a highly diluted mixture.

In four-stroke engines with traditional valve means, the residual content is low and HCCI at part load is difficult to achieve. Known methods to induce HCCI at low and part loads include: 1) intake air heating, 2) variable compression ratio, and 3) blending gasoline with ignition promoters to create a more easily ignitable mixture than gasoline. In all the above methods, the range of engine speeds and loads in which HCCI can be achieved is relatively narrow. Extended range HCCI has been demonstrated in four-stroke gasoline engines using variable valve actuation with certain valve control strategies that effect a high proportion of residual combustion products from a previous combustion cycle necessary for HCCI in a highly diluted mixture. With such valve strategies, the range of engine speeds and loads in which HCCI can be achieved is greatly expanded using a conventional compression ratio. One such valve strategy includes trapping and recompression of exhaust gases by early closure of the exhaust valve during the exhaust stroke and low valve lift. Such valve control can be implemented using variable cam phasers and two-step lift cams.

PCCI is an engine operating mode well known in the art and is a similar engine operating mode to the aforementioned HCCI mode. One having ordinary skill in the art will appreciate that PCCI is essentially a diesel equivalent to HCCI operated in gasoline engines. Diesel engines operating in particular speed and load ranges and running in a PCCI mode can realize advantageous engine emissions result in comparison to diesel engines operating under conventional lean operation.

Stratified charge SIDI (stratified-charge SIDI) is also an engine combustion mode well known in the art and is a means to improve engine performance under particular operating conditions. One having ordinary skill in the art will appreciate that stratified-charge SIDI includes, within a particular operating range, managing the concentration and pattern of fuel-air mixture around the spark plug at the spark time using direct in-cylinder gasoline injection and intentionally creating an efficient combustion event acting upon the piston, thereby increasing the engine efficiency.

The above described engine combustion processes to enhance vehicle performance are highly dependent upon engine design and vehicle operating conditions, in particular, the engine speeds and engine loads demanded of the engine. A number of methods are contemplated to process information available from vehicle sensors, such as vehicle speed, engine speed, output torque, etc., in order to predictively estimate vehicle operating conditions to facilitate efficient and low emission vehicle operation. Such methods can estimate changing conditions and their effects upon the vehicle in the short term based upon changes and the rates of change of readings from the vehicle sensors. While these short term predictions of vehicle operating conditions are useful to modulating immediate combustion modes and reactions, they are still essentially reactionary.

Various electronic means of tracking vehicle position and coordinating vehicle position with geographic, road, traffic, or other information are known. Monitoring such data is commonly known as utilizing map preview information. Preferred and accessible electronic means to accomplish such data acquisition includes global position systems (GPS) in coordination with electronic maps, digital map software using means to track the movement of the vehicle, internet-based wireless-accessible data processing, vehicle to vehicle communications, and vehicle to infrastructure communications and other remote computing resources. These electronic means provide a wide variety of information which can be used to adjust vehicle and engine operations based upon the particulars of the environment in which the vehicle is operating or likely to soon operate. Information from such systems include: road classification, such as highway, local road, parking lot, gravel road, etc.; speed limits for various stretches of road; traffic conditions for various stretches of road, including real-time evaluations of congestion, signals sent from cooperating vehicles experiencing traffic, analysis of cellular phone patterns in other cars, predictions based upon likely rush hour traffic or special event (e.g. sporting event) traffic; road slopes; road curvature; location and status of traffic lights, signals, construction zone markers, speed bumps, or other traffic direction indicators impacting vehicular travel; existence or lack of features likely to impact travel along a certain stretch of road, such as exit ramps or truck weigh stations; and analysis of vehicle or specific operator driving patterns, habits, registered schedules, electronic planner calendars, or other predictive measures. Additionally, likely routes of travel can be estimated based upon operator entered destinations, computerized analysis of driver habits and patterns, or other means.

SUMMARY

A method of operating a vehicular powertrain including an internal combustion engine includes monitoring map preview information, determining a projected vehicle path based upon the map preview information, determining likely engine operation demands along the projected vehicle path, wherein the likely engine operation demands includes likely required engine speeds and likely required engine loads, determining selectable engine operating modes at each likely engine operating demand, and executing engine operation based upon the selectable engine operating modes.

BRIEF DESCRIPTION OF THE DRAWINGS

The disclosure may take physical form in certain parts and arrangement of parts, the preferred embodiment of which will be described in detail and illustrated in the drawings incorporated hereinafter, comprising.

DETAILED DESCRIPTION

Figure 1:
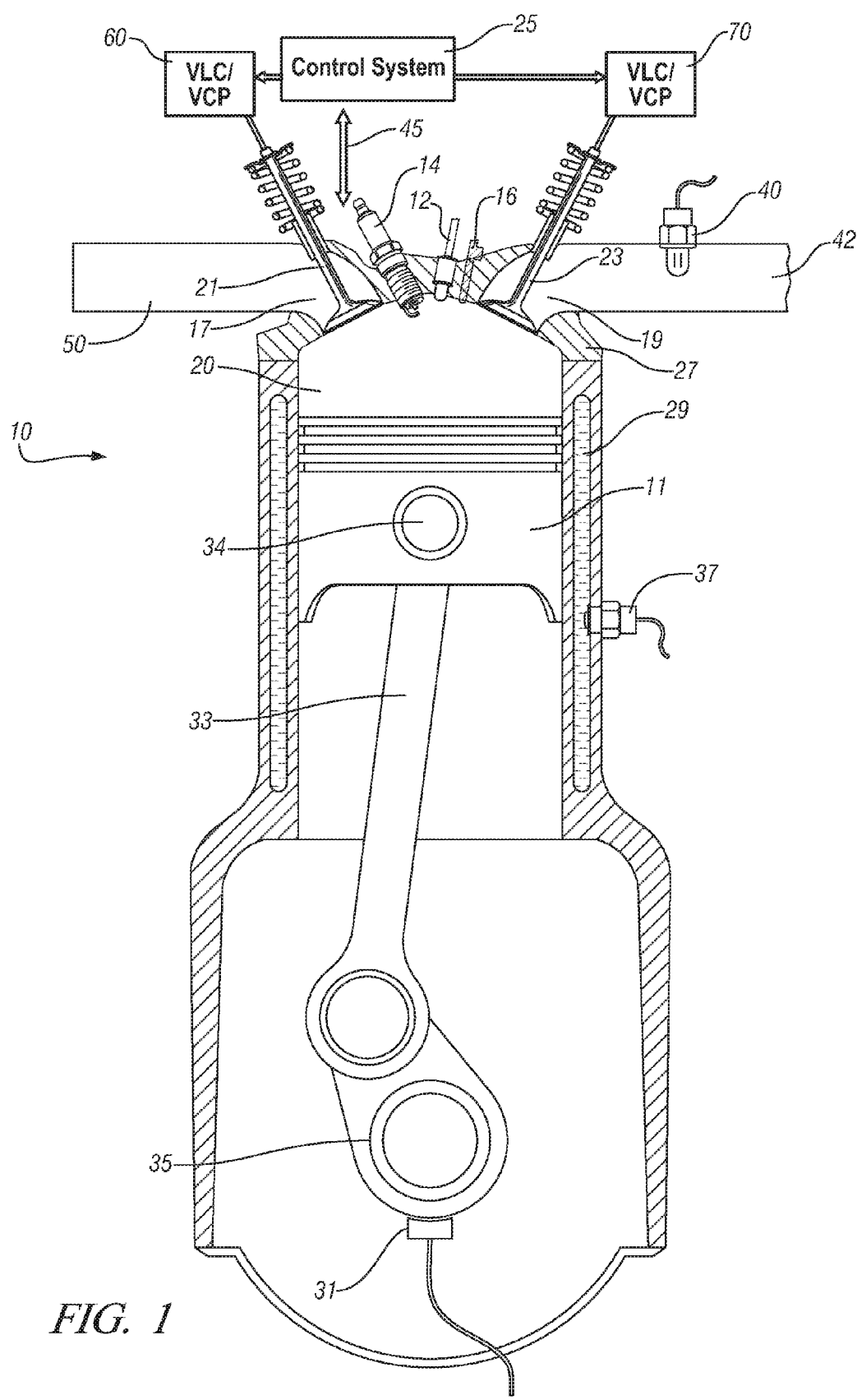
FIG. 1 schematically depicts an exemplary internal combustion engine and control system, in accordance with the present disclosure.

Referring now to the drawings, wherein the showings are for the purpose of illustrating certain exemplary embodiments only and not for the purpose of limiting the same, FIG. 1 schematically depicts an internal combustion engine 10 and control system 25 which has been constructed in accordance with an embodiment of the present disclosure. The embodiment as shown is applied as part of an overall control scheme to operate an exemplary multi-cylinder, spark ignition, direct-injection, gasoline, four-stroke internal combustion engine adapted to operate under a controlled auto-ignition process, also referred to as homogenous-charge, compression-ignition ('HCCI') mode. However, as will be appreciated by one having ordinary skill in the art and as noted above, engine embodiments of many different configurations can benefit from the methods of the present disclosure, and the disclosure is not intended to be limited to the exemplary embodiments described herein.

In the present exemplary exposition of the disclosure, a naturally aspirated, four-stroke, single cylinder, 0.55 liter, controlled auto-ignition, gasoline direct injection fueled internal combustion engine having a compression ratio of substantially 12 to 13 was utilized in implementing the valve and fueling controls and acquisition of the various data embodied herein. Unless specifically discussed otherwise, all such implementations and acquisitions are assumed to be carried out under standard conditions as understood by one having ordinary skill in the art.

The exemplary engine 10 includes a cast-metal engine block with a plurality of cylinders formed therein, one of which is shown, and an engine head 27. Each cylinder comprises a closed-end cylinder having a movable, reciprocating piston 11 inserted therein. A variable volume combustion chamber 20 is formed in each cylinder, and is defined by walls of the cylinder, the movable piston 11, and the head 27. The engine block preferably includes coolant passages 29 through which engine coolant fluid passes. A coolant temperature sensor 37, operable to monitor temperature of the coolant fluid, is located at an appropriate location, and provides a parametric signal input to the control system 25 usable to control the engine. The engine preferably includes known systems including an external exhaust gas recirculation ('EGR') valve and an intake air throttle valve (not shown).

Each movable piston 11 comprises a device designed in accordance with known piston forming methods, and includes a top and a body which conforms substantially to the cylinder in which it operates. The piston has a top or crown area that is exposed in the combustion chamber. Each piston is connected via a pin 34 and connecting rod 33 to a crankshaft 35. The crankshaft 35 is rotatably attached to the engine block at a main bearing area near a bottom portion of the engine block, such that the crankshaft is able to rotate around an axis that is perpendicular to a longitudinal axis defined by each cylinder. A crank sensor 31 is placed in an appropriate location, operable to generate a signal that is usable by the controller 25 to measure crank angle, and which is translatable to provide measures of crankshaft rotation, speed, and acceleration that are usable in various control schemes. During operation of the engine, each piston 11 moves up and down in the cylinder in a reciprocating fashion due to connection to and rotation of the crankshaft 35, and the combustion process. The rotation action of the crankshaft effects translation of linear force exerted on each piston during combustion to an angular torque output from the crankshaft, which can be transmitted to another device, e.g. a vehicle driveline.

The engine head 27 comprises a cast-metal device having one or more intake ports 17 and one or more exhaust ports 19 which flow to the combustion chamber 20. The intake port 17 supplies air to the combustion chamber 20. Combusted (burned) gases flow from the combustion chamber 20 via exhaust port 19. Flow of air through each intake port is controlled by actuation of one or more intake valves 21. Flow of combusted gases through each exhaust port is controlled by actuation of one or more exhaust valves 23.

The intake and exhaust valves 21, 23 each have a head portion that includes a top portion that is exposed to the combustion chamber. Each of the valves 21, 23 has a stem that is connected to a valve actuation device. A valve actuation device, depicted as 60, is operative to control opening and closing of each of the intake valves 21, and a second valve actuation device 70 operative to control opening and closing of each of the exhaust valves 23. Each of the valve actuation devices 60, 70 comprises a device signally connected to the control system 25 and operative to control timing, duration, and magnitude of opening and closing of each valve, either in concert or individually. The first embodiment of the exemplary engine comprises a dual overhead cam system which has variable lift control ('VLC') and variable cam phasing ('VCP') devices. The VCP device is operative to control timing of opening or closing of each intake valve and each exhaust valve relative to rotational position of the crankshaft and opens each valve for a fixed crank angle duration. The exemplary VLC device is operative to control magnitude of valve lift to one of two positions: one position to 3-5 mm lift for an open duration of 120-150 crank angle degrees, and another position to 9-12 mm lift for an open duration of 220-260 crank angle degrees. Individual valve actuation devices can serve the same function to the same effect. The valve actuation devices are preferably controlled by the control system 25 according to predetermined control schemes. Alternative variable valve actuation devices including, for example, fully flexible electrical or electro-hydraulic devices may also be used and have the further benefit of independent opening and closing phase control as well as substantially infinite valve lift variability within the limits of the system. A specific aspect of a control scheme to control opening and closing of the valves is described herein.

Air is inlet to the intake port 17 through an intake manifold runner 50, which receives filtered air passing through a known air metering device and a throttle device (not shown). Exhaust gas passes from the exhaust port 19 to an exhaust manifold 42, which includes exhaust gas sensors 40 operative to monitor constituents of the exhaust gas feedstream, and determine parameters associated therewith. The exhaust gas sensors 40 can comprise any of several known sensing devices operative to provide parametric values for the exhaust gas feedstream, including air/fuel ratio, or measurement of exhaust gas constituents, e.g. NOx, CO, HC, and others. The system may include an in-cylinder sensor 16 for monitoring combustion pressures, or non-intrusive pressure sensors or inferentially determined pressure determination (e.g. through crankshaft accelerations). The aforementioned sensors and metering devices each provide a signal as a parametric input to the control system 25. These parametric inputs can be used by the control system to determine combustion performance measurements.

The control system 25 preferably comprises a subset of an overall control architecture operable to provide coordinated system control of the engine 10 and other systems. In overall operation, the control system 25 is operable to synthesize operator inputs, ambient conditions, engine operating parameters, and combustion performance measurements, and execute algorithms to control various actuators to achieve targets for control parameters, including such parameters as fuel economy, emissions, performance, and drivability. The control system 25 is operably connected to a plurality of devices through which an operator typically controls or directs operation of the engine. Exemplary operator inputs include an accelerator pedal, a brake pedal, transmission gear selector, and vehicle speed cruise control when the engine is employed in a vehicle. The control system may communicate with other controllers, sensors, and actuators via a local area network ('LAN') bus (not shown) which preferably allows for structured communication of control parameters and commands between various controllers.

The control system 25 is operably connected to the engine 10, and functions to acquire parametric data from sensors, and control a variety of actuators of the engine 10 over appropriate interfaces 45. The control system 25 receives an engine torque command, and generates a desired torque output, based upon the operator inputs. Exemplary engine operating parameters that are sensed by control system 25 using the aforementioned sensors include engine temperature, as indexed by methods such as monitoring engine coolant temperature, oil temperature, or metal temperature; crankshaft rotational speed ('RPM') and position; manifold absolute pressure; ambient air flow and temperature; and ambient air pressure. Combustion performance measurements typically comprise measured and inferred combustion parameters including, for example, air/fuel ratio and location of peak combustion pressure.

Actuators controlled by the control system 25 include: fuel injectors 12; the VCP/VLC valve actuation devices 60, 70; spark plug 14 operably connected to ignition modules for controlling spark dwell and timing; exhaust gas recirculation (EGR) valve (not separately illustrated), and, electronic throttle control module (not shown). Fuel injector 12 is preferably operable to inject fuel directly into each combustion chamber 20. Specific details of exemplary direct injection fuel injectors are known and not detailed herein. Spark plug 14 is employed by the control system 25 to enhance ignition timing control of the exemplary engine across portions of the engine speed and load operating range. When the exemplary engine is operated in a purely HCCI mode, the engine does not utilize an energized spark plug. However, it has proven desirable to employ spark ignition to complement the HCCI mode under certain conditions including, for example, during cold start, to prevent fouling and, in accordance with certain aspects of the present disclosure at low load operating conditions near a low-load limit. Also, it has proven preferable to employ spark ignition at a high load operation limit in the HCCI mode, and at high speed/load operating conditions under throttled or un-throttled spark-ignition operation.

The control system 25 preferably comprises a general-purpose digital computer generally comprising a microprocessor or central processing unit, read only memory (ROM), random access memory (RAM), electrically programmable read only memory (EPROM), high speed clock, analog to digital (A/D) and digital to analog (D/A) circuitry, and input/output circuitry and devices (I/O) and appropriate signal conditioning and buffer circuitry. Control system 25 has a set of control algorithms, comprising resident program instructions and calibrations stored in ROM.

Algorithms for engine control are typically executed during preset loop cycles such that each algorithm is executed at least once each loop cycle. Algorithms stored in the non-volatile memory devices are executed by the central processing unit and are operable to monitor inputs from the sensing devices and execute control and diagnostic routines to control operation of the engine, using preset calibrations. Loop cycles are typically executed at regular intervals, for example each 3.125, 6.25, 12.5, 25 and 100 milliseconds during ongoing engine operation. Alternatively, algorithms may be executed in response to occurrence of an event or interrupt request.

Figure 2:
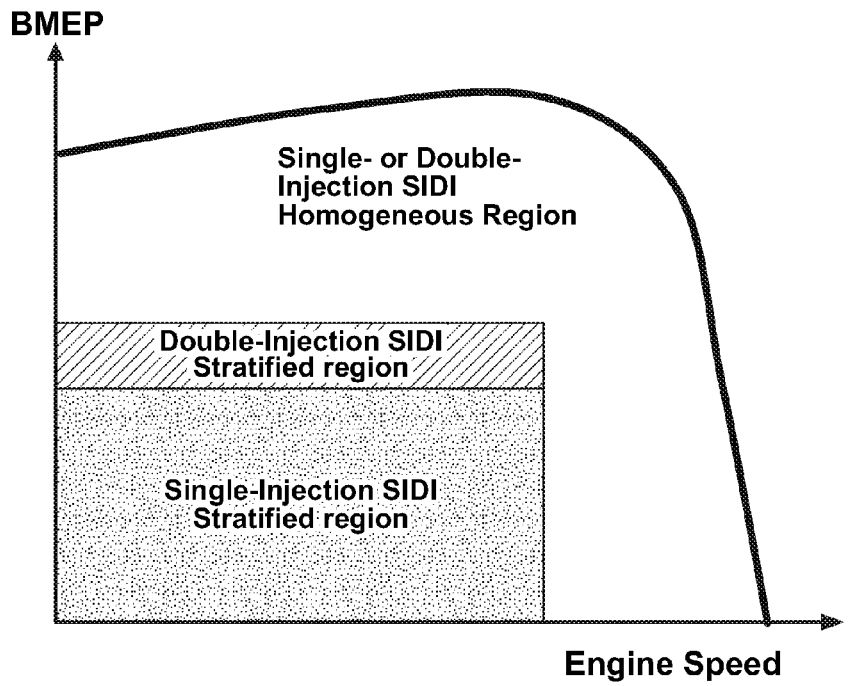
FIG. 2 graphically illustrates operation of an exemplary direct injection engine in a range of engine speeds and loads wherein a stratified-charge SIDI operating mode is possible, in accordance with the present disclosure.

As described above, combustion engines such as engine 10, depending upon the engine configuration, fuel type, control methodology, etc., can be operated in a number of engine operating modes. The engine operating modes available for an engine to run at any point is largely controlled by the engine speed and engine load at which the engine is presently operating. FIG. 2 graphically illustrates operation of an exemplary direct injection engine in a range of engine speeds and loads wherein a stratified-charge operating mode is possible, in accordance with the present disclosure. Stratified-charge SIDI operation, as depicted, is a comparatively fuel efficient mode as compared to homogeneous-charge SIDI operation. However, stratified-charge SIDI operation is only possible at lower engine speeds and engine loads. Also, operation under stratified-charge SIDI increases NOx production. The region between the single-injection stratified-charge SIDI and the homogeneous SIDI regions, labeled as a region of double-injection stratified-charge SIDI, can include operation in either operating mode, depending upon other operating characteristics such as a need to utilize homogeneous-charge SI operation to purge accumulated NOx pollutant from exhaust aftertreatment devices. It will also be noted that the regions depicted "stratified" demonstrate an area or region in which stratified-charge SIDI is possible, but homogeneous-charge SIDI operation is selectable substantially anywhere within the illustrated region.

Figure 3:
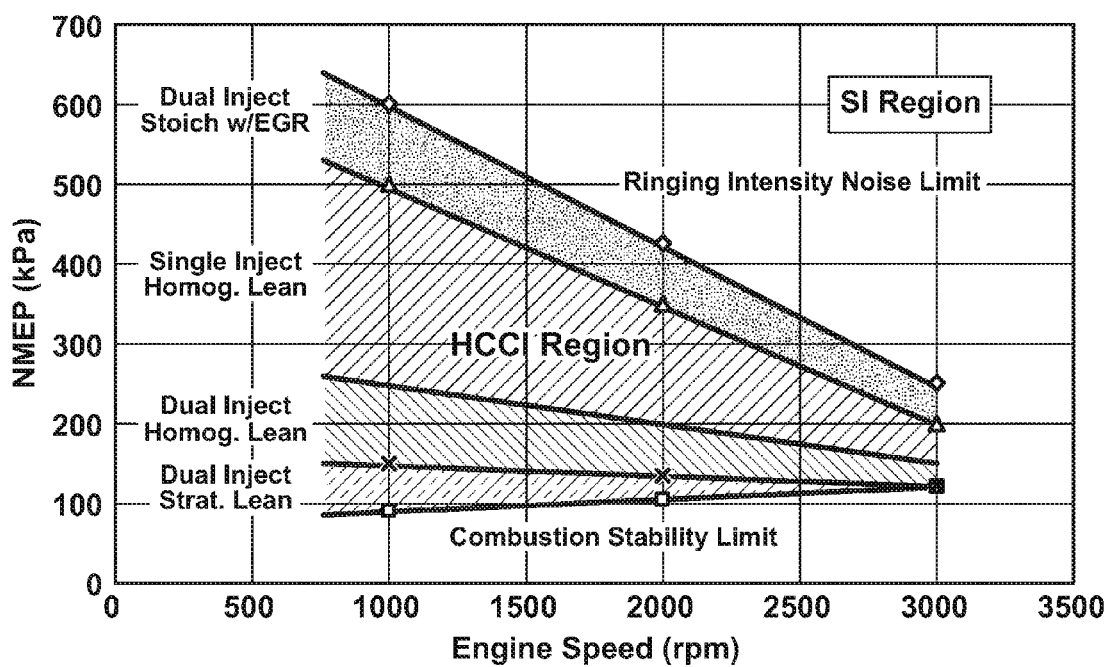
FIG. 3 graphically illustrates operation of an exemplary direct injection engine in a range of engine speeds and loads wherein an HCCI operating mode is possible, in accordance with the present disclosure.

FIG. 3 graphically illustrates operation of an exemplary direct injection engine in a range of engine speeds and loads wherein an HCCI operating mode is possible, in accordance with the present disclosure. As described above, HCCI is an energy efficient mode of operation, wherein a lean fuel ratio charge is compressed to a point of auto-ignition. Because no spark is utilized in HCCI mode, successful and timely combustion of the charge requires a particular range of conditions within the combustion chamber in order to maintain stable combustion. If temperatures and complications such as hot spots within the combustion chamber arise due to high engine speeds and engine loads, the charge can combust early and in a disorderly progression, causing ringing or other malfunctions eliminating the benefit of HCCI operation. If not enough heat is present within the combustion chamber due to low load operation, then auto-ignition may not regularly and reliably occur. Additionally, operation under stratified HCCI increases NOx production. It will also be noted that the regions depicted demonstrate an area or region in which HCCI mode is possible, but SI mode is selectable substantially anywhere within the illustrated region.

FIG. 2 and FIG. 3 demonstrate that selection of engine operating modes present opportunities and risks that can be realized within certain zones of engine speed and load. These regions represent exemplary opportunities that can be realized by predicting engine speed and engine load through a likely travel route within a combustion engine. However, other methods are known by those having ordinary skill in the art. Different methods are known to control and modulate the combustion process. For instance, as described above, a method is known wherein cylinders can be shut down during the operation of the engine during operation at low loads in order to conserve fuel. By the method disclosed herein, cylinders could be turned on or off in anticipation of changing environmental conditions through which the vehicle is likely to travel. Use of EGR circuits is known to lower combustion temperatures within the combustion chamber in order to reduce harmful emissions. Similarly, water injection into the combustion chamber is also known to lower combustion temperatures within the combustion chamber for the same purpose. These engine operation modes can be modulated on the basis of predicted engine speeds and engine loads. Many engine operating modes are known in the art, the examples described herein are for illustration only, and the disclosure is not intended to be limited to the particular embodiments described herein.

Figure 4:
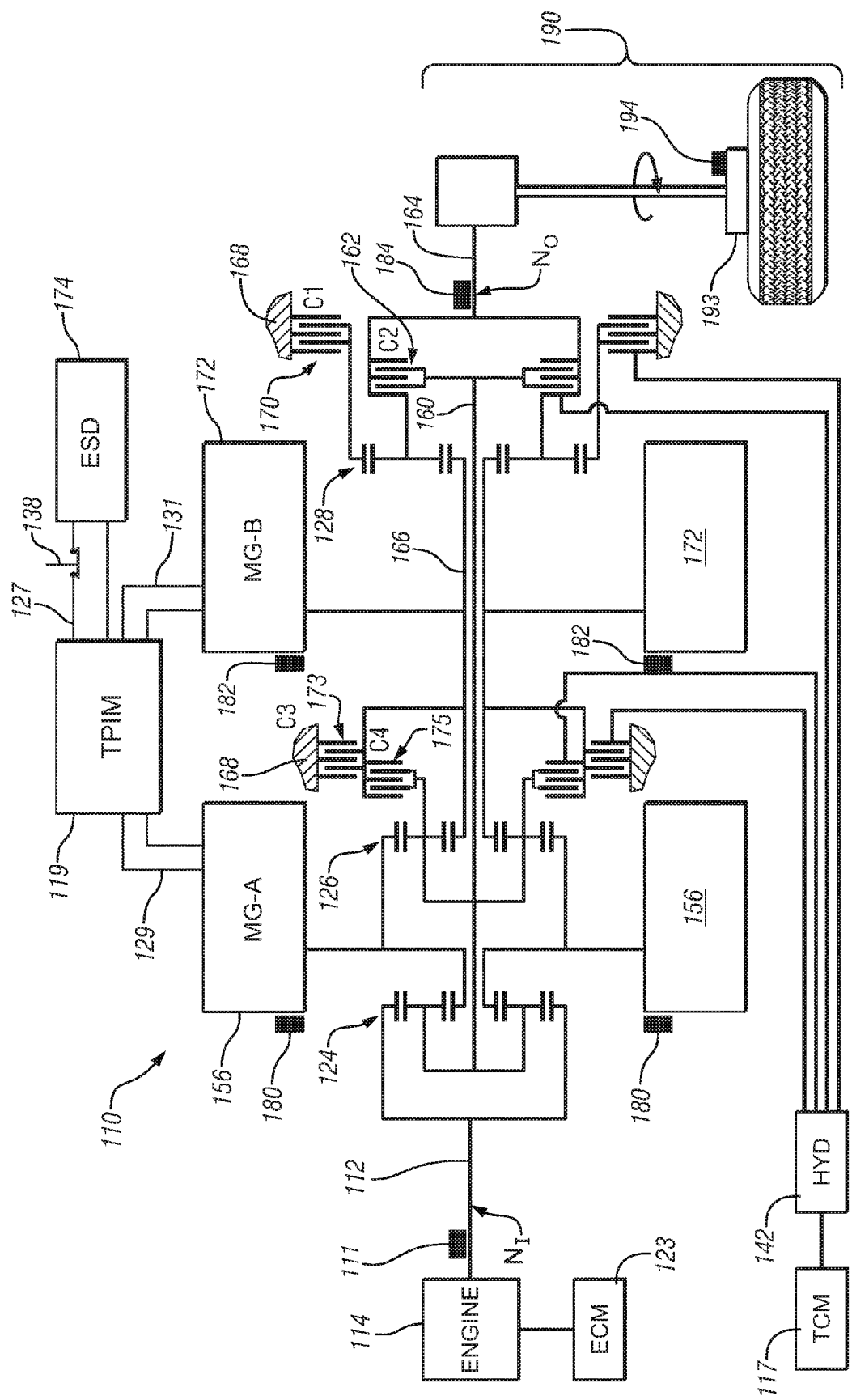
FIG. 4 schematically depicts an exemplary electromechanical hybrid powertrain, comprising a two-mode, compound-split, electromechanical hybrid transmission operatively connected to an engine and first and second electric machines, in accordance with the present disclosure.
Figure 5:
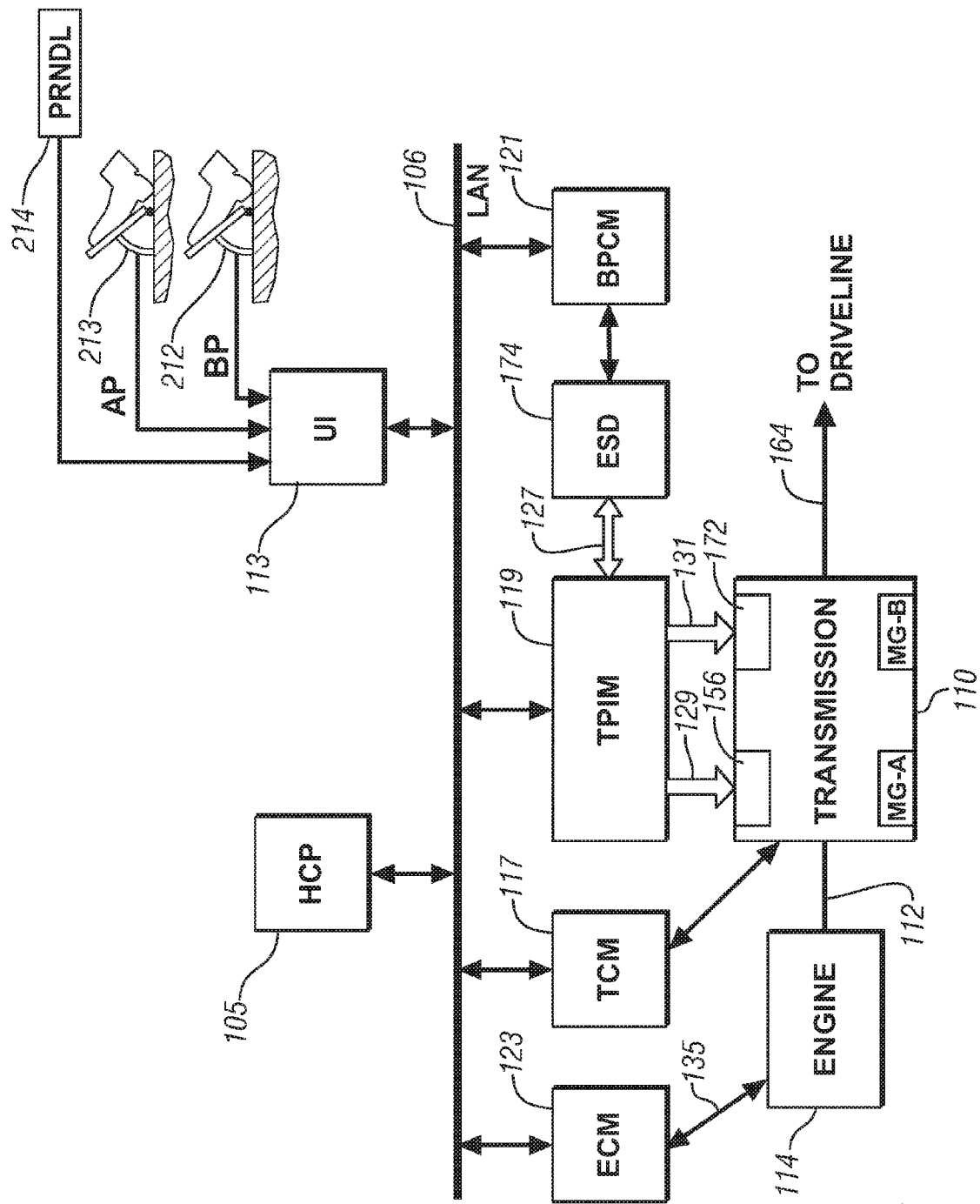
FIG. 5 is a schematic block diagram of a distributed hybrid powertrain control module system, in accordance with the present disclosure.

FIGS. 4 and 5 depict an exemplary electromechanical hybrid powertrain. The exemplary electromechanical hybrid powertrain in accordance with the present disclosure is depicted in FIG. 4, comprising a two-mode, compound-split, electromechanical hybrid transmission 110 operatively connected to an engine 114 and first and second electric machines ('MG-A') 156 and ('MG-B') 172. The engine 114 and first and second electric machines 156 and 172 each generate power which can be transmitted to the transmission 110. The power generated by the engine 114 and the first and second electric machines 156 and 172 and transmitted to the transmission 110 is described in terms of input torques, referred to herein as $T_I$, $T_A$, and $T_B$ respectively, and speed, referred to herein as $N_I$, $N_A$, and $N_B$, respectively.

The exemplary engine 114 comprises a multi-cylinder internal combustion engine selectively operative in several states to transmit torque to the transmission 110 via an input shaft 112, and can be either a spark-ignition or a compression-ignition engine. The engine 114 includes a crankshaft (not shown) operatively coupled to the input shaft 112 of the transmission 110. A rotational speed sensor 111 monitors rotational speed of the input shaft 112. Power output from the engine 114, comprising rotational speed and output torque, can differ from the input speed, $N_I$, and the input torque, $T_I$, to the transmission 110 due to placement of torque-consuming components on the input shaft 112 between the engine 114 and the transmission 110, e.g., a hydraulic pump (not shown) and/or a torque management device (not shown).

The exemplary transmission 110 comprises three planetary-gear sets 124, 126 and 128, and four selectively engageable torque-transmitting devices, i.e., clutches C1 170, C2 162, C3 173, and C4 175. As used herein, clutches refer to any type of friction torque transfer device including single or compound plate clutches or packs, band clutches, and brakes, for example. A hydraulic control circuit 142, preferably controlled by a transmission control module (hereafter 'TCM') 117, is operative to control clutch states. Clutches C2 162 and C4 175 preferably comprise hydraulically-applied rotating friction clutches. Clutches C1 170 and C3 173 preferably comprise hydraulically-controlled stationary devices that can be selectively grounded to a transmission case 168. Each of the clutches C1 170, C2 162, C3 173, and C4 175 is preferably hydraulically applied, selectively receiving pressurized hydraulic fluid via the hydraulic control circuit 142.

The first and second electric machines 156 and 172 preferably comprise three-phase AC machines, each including a stator (not shown) and a rotor (not shown), and respective resolvers 180 and 182. The motor stator for each machine is grounded to an outer portion of the transmission case 168, and includes a stator core with coiled electrical windings extending therefrom. The rotor for the first electric machine 156 is supported on a hub plate gear that is operatively attached to shaft 160 via the second planetary gear set 126. The rotor for the second electric machine 172 is fixedly attached to a sleeve shaft hub 166.

Each of the resolvers 180 and 182 preferably comprises a variable reluctance device including a resolver stator (not shown) and a resolver rotor (not shown). The resolvers 180 and 182 are appropriately positioned and assembled on respective ones of the first and second electric machines 156 and 172. Stators of respective ones of the resolvers 180 and 182 are operatively connected to one of the stators for the first and second electric machines 156 and 172. The resolver rotors are operatively connected to the rotor for the corresponding first and second electric machines 156 and 172. Each of the resolvers 180 and 182 is signally and operatively connected to a transmission power inverter control module (hereafter 'TPIM') 119, and each senses and monitors rotational position of the resolver rotor relative to the resolver stator, thus monitoring rotational position of respective ones of first and second electric machines 156 and 172. Additionally, the signals output from the resolvers 180 and 182 are interpreted to provide the rotational speeds for first and second electric machines 156 and 172, i.e., $N_A$ and $N_B$, respectively.

The transmission 110 includes an output member 164, e.g. a shaft, which is operably connected to a driveline 190 for a vehicle (not shown), to provide output power, e.g., to vehicle wheels 193, one of which is shown in FIG. 4. The output power is characterized in terms of an output rotational speed, $N_O$, and an output torque, $T_O$. A transmission output speed sensor 184 monitors rotational speed and rotational direction of the output member 164. Each of the vehicle wheels 193, is preferably equipped with a sensor 194 adapted to monitor wheel speed, $V_{SS-WHL}$, the output of which is monitored by a control module of a distributed control module system described with respect to FIG. 5, to determine vehicle speed, and absolute and relative wheel speeds for braking control, traction control, and vehicle acceleration management.

The input torques from the engine 114 and the first and second electric machines 156 and 172 ($T_I$, $T_A$, and $T_B$ respectively) are generated as a result of energy conversion from fuel or electrical potential stored in an electrical energy storage device (hereafter 'ESD') 174. The ESD 174 is high voltage DC-coupled to the TPIM 119 via DC transfer conductors 127. The transfer conductors 127 include a contactor switch 138. When the contactor switch 138 is closed, under normal operation, electric current can flow between the ESD 174 and the TPIM 119. When the contactor switch 138 is opened electric current flow between the ESD 174 and the TPIM 119 is interrupted. The TPIM 119 transmits electrical power to and from the first electric machine 156 by transfer conductors 129, and the TPIM 119 similarly transmits electrical power to and from the second electric machine 172 by transfer conductors 131, in response to torque commands for the first and second electric machines 156 and 172 to achieve the input torques $T_A$ and $T_B$. Electrical current is transmitted to and from the ESD 174 in accordance with whether the ESD 174 is being charged or discharged.

The TPIM 119 includes the pair of power inverters (not shown) and respective motor control modules (not shown) configured to receive the torque commands and control inverter states therefrom for providing motor drive or regeneration functionality to achieve the input torques $T_A$ and $T_B$. The power inverters comprise known complementary three-phase power electronics devices, and each includes a plurality of insulated gate bipolar transistors (not shown) for converting DC power from the ESD 174 to AC power for powering respective ones of the first and second electric machines 156 and 172, by switching at high frequencies. The insulated gate bipolar transistors form a switch mode power supply configured to receive control commands. There is typically one pair of insulated gate bipolar transistors for each phase of each of the three-phase electric machines. States of the insulated gate bipolar transistors are controlled to provide motor drive mechanical power generation or electric power regeneration functionality. The three-phase inverters receive or supply DC electric power via respective ones of the transfer conductors 129 and 131 and transform it to or from three-phase AC power, which is conducted to or from the first and second electric machines 156 and 172 for operation as motors or generators.

FIG. 5 is a schematic block diagram of the distributed control module system. The elements described hereinafter comprise a subset of an overall vehicle control architecture, and provide coordinated system control of the exemplary powertrain described in FIG. 4. The distributed control module system synthesizes pertinent information and inputs, and executes algorithms to control various actuators to achieve control objectives, including objectives related to fuel economy, emissions, performance, drivability, and protection of hardware, including batteries of ESD 174 and the first and second electric machines 156 and 172. The distributed control module system includes an engine control module (hereafter 'ECM') 123, the TCM 117, a battery pack control module (hereafter 'BPCM') 121, and the TPIM 119. A hybrid control module (hereafter 'HCP') 105 provides supervisory control and coordination of the ECM 123, the TCM 117, the BPCM 121, and the TPIM 119. A user interface ('UI') 113 is operatively connected to a plurality of devices through which a vehicle operator controls or directs operation of the electromechanical hybrid powertrain. The devices include an accelerator pedal 213 ('AP') from which an operator torque request is determined, an operator brake pedal 212 ('BP'), a transmission gear selector 214 ('PRNDL'), and a vehicle speed cruise control (not shown). The transmission gear selector 214 may have a discrete number of operator-selectable positions, including the rotational direction of the output member 164 to enable one of a forward and a reverse direction.

The aforementioned control modules communicate with other control modules, sensors, and actuators via a local area network or LAN bus 106. The LAN bus 106 allows for structured communication of states of operating parameters and actuator command signals between the various control modules. The specific communication protocol utilized is application-specific. The LAN bus 106 and appropriate protocols provide for robust messaging and multi-control module interfacing between the aforementioned control modules, and other control modules providing functionality such as antilock braking, traction control, and vehicle stability. Multiple communications buses may be used to improve communications speed and provide some level of signal redundancy and integrity. Communication between individual control modules can also be effected using a direct link, e.g., a serial peripheral interface ('SPI') bus (not shown).

The HCP 105 provides supervisory control of the powertrain, serving to coordinate operation of the ECM 123, TCM 117, TPIM 119, and BPCM 121. Based upon various input signals from the user interface 13 and the powertrain, including the ESD 174, the HCP 105 generates various commands, including: the operator torque request ('$T_{O\_REQ}$'), a commanded output torque ('$T_{CMD}$') to the driveline 190, an engine input torque command, clutch torques for the torque-transfer clutches C1 170, C2 162, C3 173, C4 175 of the transmission 110; and the torque commands for the first and second electric machines 156 and 172, respectively. The TCM 117 is operatively connected to the hydraulic control circuit 142 and provides various functions including monitoring various pressure sensing devices (not shown) and generating and communicating control signals to various solenoids (not shown) thereby controlling pressure switches and control valves contained within the hydraulic control circuit 142.

The ECM 123 is operatively connected to the engine 114, and functions to acquire data from sensors and control actuators of the engine 114 over a plurality of discrete lines, shown for simplicity as an aggregate bi-directional interface cable 135. The ECM 123 receives the engine input torque command from the HCP 105. The ECM 123 determines the actual engine input torque, $T_I$, provided to the transmission 110 at that point in time based upon monitored engine speed and load, which is communicated to the HCP 105. The ECM 123 monitors input from the rotational speed sensor 111 to determine the engine input speed to the input shaft 112, which translates to the transmission input speed, $N_I$. The ECM 123 monitors inputs from sensors (not shown) to determine states of other engine operating parameters including, e.g., a manifold pressure, engine coolant temperature, ambient air temperature, and ambient pressure. The engine load can be determined, for example, from the manifold pressure, or alternatively, from monitoring operator input to the accelerator pedal 213. The ECM 123 generates and communicates command signals to control engine actuators, including, e.g., fuel injectors, ignition modules, and throttle control modules, none of which are shown.

The TCM 117 is operatively connected to the transmission 110 and monitors inputs from sensors (not shown) to determine states of transmission operating parameters. The TCM 117 generates and communicates command signals to control the transmission 110, including controlling the hydraulic circuit 142. Inputs from the TCM 117 to the HCP 105 include estimated clutch torques for each of the clutches, i.e., C1 170, C2 162, C3 173, and C4 175, and rotational output speed, $N_O$, of the output member 64. Other actuators and sensors may be used to provide additional information from the TCM 117 to the HCP 105 for control purposes. The TCM 117 monitors inputs from pressure switches (not shown) and selectively actuates pressure control solenoids (not shown) and shift solenoids (not shown) of the hydraulic circuit 142 to selectively actuate the various clutches C1 170, C2 162, C3 173, and C4 175 to achieve various transmission operating range states, as described hereinbelow.

The BPCM 121 is signally connected to sensors (not shown) to monitor the ESD 174, including states of electrical current and voltage parameters, to provide information indicative of parametric states of the batteries of the ESD 174 to the HCP 105. The parametric states of the batteries preferably include battery state-of-charge, battery voltage, battery temperature, and available battery power, referred to as a range $P_{BAT\_MIN}$ to $P_{BAT\_MAX}$.

Each of the control modules ECM 123, TCM 117, TPIM 119 and BPCM 121 is preferably a general-purpose digital computer comprising a microprocessor or central processing unit, storage mediums comprising read only memory ('ROM'), random access memory ('RAM'), electrically programmable read only memory ('EPROM'), a high speed clock, analog to digital ('A/D') and digital to analog ('D/A') circuitry, and input/output circuitry and devices ('I/O') and appropriate signal conditioning and buffer circuitry. Each of the control modules has a set of control algorithms, comprising resident program instructions and calibrations stored in one of the storage mediums and executed to provide the respective functions of each computer. Information transfer between the control modules is preferably accomplished using the LAN bus 106 and serial peripheral interface buses. The control algorithms are executed during preset loop cycles such that each algorithm is executed at least once each loop cycle. Algorithms stored in the non-volatile memory devices are executed by one of the central processing units to monitor inputs from the sensing devices and execute control and diagnostic routines to control operation of the actuators, using preset calibrations. Loop cycles are executed at regular intervals, for example each 3.125, 6.25, 12.5, 25 and 100 milliseconds during ongoing operation of the powertrain. Alternatively, algorithms may be executed in response to the occurrence of an event.

The exemplary powertrain selectively operates in one of several operating range states that can be described in terms of an engine state comprising one of an engine on state ('ON') and an engine off state ('OFF'), and a transmission state comprising a plurality of fixed gears and continuously variable operating modes, described with reference to Table 1, below.

TABLE 1

| Description | Engine State | Transmission Operating Range State | Applied Clutches |
| --- | --- | --- | --- |
| MI_Eng_Off | OFF | EVT Mode I | C1 170 |
| MI_Eng_On | ON | EVT Mode I | C1 170 |
| FG1 | ON | Fixed Gear Ratio 1 | C1 170 C4 175 |
| FG2 | ON | Fixed Gear Ratio 2 | C1 170 C2 162 |
| MII_Eng_Off | OFF | EVT Mode II | C2 162 |
| MII_Eng_On | ON | EVT Mode II | C2 162 |
| FG3 | ON | Fixed Gear Ratio 3 | C2 162 C4 175 |
| FG4 | ON | Fixed Gear Ratio 4 | C2 162 C3 173 |

Each of the transmission operating range states is described in the table and indicates which of the specific clutches C1 170, C2 162, C3 173, and C4 175 are applied for each of the operating range states. A first continuously variable mode, i.e., EVT Mode I, or MI, is selected by applying clutch C1 170 only in order to "ground" the outer gear member of the third planetary gear set 128. The engine state can be one of ON ('MI_Eng_On') or OFF ('MI_Eng_Off'). A second continuously variable mode, i.e., EVT Mode II, or MII, is selected by applying clutch C2 162 only to connect the shaft 160 to the carrier of the third planetary gear set 128. The engine state can be one of ON ('MII_Eng_On') or OFF ('MI-I_Eng_Off'). For purposes of this description, when the engine state is OFF, the engine input speed is equal to zero revolutions per minute ('RPM'), i.e., the engine crankshaft is not rotating. A fixed gear operation provides a fixed ratio operation of input-to-output speed of the transmission 110, i.e., $N_I/N_O$, is achieved. A first fixed gear operation ('FG1') is selected by applying clutches C1 170 and C4 175. A second fixed gear operation 'FG2' is selected by applying clutches C1 170 and C2 162. A third fixed gear operation 'FG3' is selected by applying clutches C2 162 and C4 175. A fourth fixed gear operation 'FG4' is selected by applying clutches C2 162 and C3 173. The fixed ratio operation of input-to-output speed increases with increased fixed gear operation due to decreased gear ratios in the planetary gears 124, 126, and 128. The rotational speeds of the first and second electric machines 156 and 172, $N_A$ and $N_B$ respectively, are dependent on internal rotation of the mechanism as defined by the clutching and are proportional to the input speed measured at the input shaft 112.

In response to operator input via the accelerator pedal 213 and brake pedal 212 as captured by the user interface 113, the HCP 105 and one or more of the other control modules determine the commanded output torque, $T_{CMD}$, intended to meet the operator torque request, $T_{O\_REQ}$, to be executed at the output member 164 and transmitted to the driveline 190.

Final vehicle acceleration is affected by other factors including, e.g., road load, road grade, and vehicle mass. The operating range state is determined for the transmission 110 based upon a variety of operating characteristics of the powertrain. This includes the operator torque request, communicated through the accelerator pedal 213 and brake pedal 212 to the user interface 113 as previously described. The operating range state may be predicated on a powertrain torque demand caused by a command to operate the first and second electric machines 156 and 172 in an electrical energy generating mode or in a torque generating mode. The operating range state can be determined by an optimization algorithm or routine which determines optimum system efficiency based upon operator demand for power, battery state of charge, and energy efficiencies of the engine 114 and the first and second electric machines 156 and 172. The control system manages torque inputs from the engine 114 and the first and second electric machines 156 and 172 based upon an outcome of the executed optimization routine, and system efficiencies are optimized thereby, to manage fuel economy and battery charging. Furthermore, operation can be determined based upon a fault in a component or system. The HCP 105 monitors the torque-generative devices, and determines the power output from the transmission 110 required to achieve the desired output torque to meet the operator torque request. As should be apparent from the description above, the ESD 174 and the first and second electric machines 156 and 172 are electrically-operatively coupled for power flow therebetween. Furthermore, the engine 114, the first and second electric machines 156 and 172, and the electromechanical transmission 110 are mechanically-operatively coupled to transmit power therebetween to generate a power flow to the output member 164.

Figure 6:
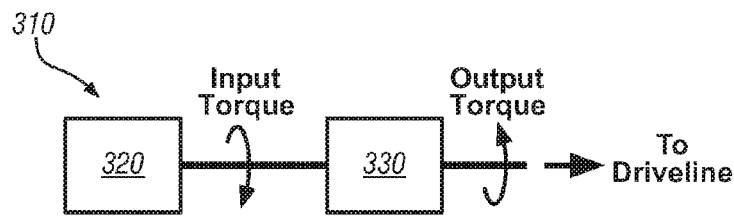
FIG. 6 schematically depicts an exemplary vehicular powertrain, illustrating a relationship between input torque and output torque applied across a transmission assembly, in accordance with the present disclosure.

FIG. 6 schematically depicts an exemplary vehicular powertrain, illustrating a relationship between input torque and output torque applied across a transmission assembly, in accordance with the present disclosure. Vehicle 310 comprises an engine 320 and a transmission 330. Under normal operation, including vehicle acceleration, steady state operation, or gradual deceleration, the engine 320 supplies an input torque to the transmission 330, and transmission 330 converts the input torque, through a gear ratio internal to the transmission and, in an automatic transmission, subject to losses associated with operation of a torque converter, into an output torque, powering the driveline (not shown) of vehicle 310. Under engine braking operation, wherein the vehicle speed is controlled by the operation of the engine counteracting high output torque being transferred from the driveline, output torque is converted through transmission 330 as an input torque to engine 320, and frictional and pumping forces within the engine resist or provide back-torque against the output torque, thereby slowing the vehicle. In either vehicle operation described above, the engine provides torque required to meet a torque demand in relation to the output torque, for the purpose of providing longitudinal velocity control of the vehicle. Under a majority of operating conditions, the engine is being used to power the driveline, so while engine braking operation is contemplated as a potential engine operation, the disclosure will discuss generally the engine operating to provide power to the driveline.

The effect of output torque upon the driveline is a function of the operational conditions of the vehicle and the road environment on which the vehicle is operating. The magnitude of the output torque determines the magnitude of a propelling force upon the vehicle. As will be appreciated by one having ordinary skill in the art, the velocity and acceleration of an object is a result of the summation of forces acting upon the object. An object with balanced forces will not experience acceleration (including deceleration, or acceleration in a negative direction). An object with unbalanced forces will accelerate in the direction dictated by the larger force. In addition to propelling force applied by the output torque, a number of other forces act upon a vehicle, including gravitational force, drag force, and frictional forces. Therefore, longitudinal acceleration of a vehicle is determined by the balance between propelling force provided by the driveline and other forces acting generally to slow the vehicle. Monitoring environmental forces acting upon or soon to act upon the vehicle can provide a prediction regarding demands that will be made of the engine.

By using electronic devices as described above to monitor information about the environment surrounding the vehicle, a method can be utilized to predict vehicle travel including the vehicle's route and speed through the route, and in combination with other factors, for instance road slope or traffic light status, a prediction can be made regarding the engine speed and engine load likely to be demanded or experienced through the route. These likely engine speed and engine load predictions can be used to evaluate different engine operating modes possible at each point, and additionally, the engine modes in the context of foreseeable changes throughout the route. The engine modes through the route can then be selected based upon operating characteristics such as, for example, fuel efficiency, emissions, safety, performance and drivability. Such a prediction can be made statically, for instance, determining the location of an upcoming uphill route and reacting to that upcoming change in conditions by preparing to switch from a fuel efficient mode, HCCI at a lean fuel ratio for example, to a mode capable of operating at higher engine loads, for example a spark-ignition, stoichiometric fuel ratio mode. Additionally, such a prediction can be made in real-time, for instance, if an otherwise unremarkable route changes to indicate stopped traffic ahead. In such an instance, preference can be indicated to switch the engine mode to a low emission but less ideal for increasing power mode because a demand for acceleration in the presence of the upcoming slowdown is unlikely. Also, such a prediction can be made on the basis of probabilities, for example, a traffic light in a busy area can be monitored on the basis of other cooperating vehicles on the same road. In this example, if other vehicles reporting route data show that the light being approached has been green for a long time, the odds of an upcoming stop increase. As described above in relation to an expected stop, a factor can be tabulated utilizing the probability that the light signal being approached is about to turn red, and the engine operating mode for the vehicle can be selected based upon that factor. In this way, information regarding the surroundings of the vehicle can be utilized to identify and select engine operating modes most efficient to vehicle operation.

Predictions of environmental conditions along some projected vehicle path can be done on within a variety of scopes. A projected vehicle path can be formulated by simply assuming that the vehicle will continue on the present road for some distance. A projected vehicle path can instead map out all likely turns which could be made by the vehicle some distance in front of the vehicle and include within any analysis a probabilistic factor of the path likely to be followed. A projected vehicle path can include a set or predicted destination by methods described above, and thereby the projected vehicle path can define a likely vehicle route of travel. Longer projected vehicle paths offer greater flexibility in selecting between engine operating modes or hybrid control strategies. However, uncertainty or incorrect assumptions regarding vehicle paths can lead to disadvantageous vehicle utilization. One example of such a disadvantageous condition would be if a vehicle, projecting a path first on side roads and then on a highway, determined to utilize a highly fuel efficient mode resulting in high NOx emissions, thereby filling aftertreatment NOx trapping devices, in anticipation of high engine speeds and loads on the highway providing ideal conditions to purge the aftertreatment devices. If the vehicle deviates from the projected path, skipping the highway travel, less than ideal engine operating modes might have to be commanded after the deviation in order to offset the incorrectly predicted vehicle path. Certainty factors or margins of safety can be implemented within the selection of operating modes in order to mitigate such potentially disadvantageous conditions.

Figure 7:
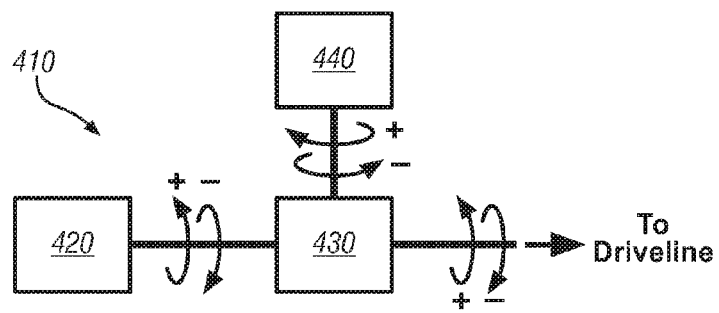
FIG. 7 schematically depicts a known hybrid powertrain, illustrating input torques applied from an engine and an electric machine, illustrating relationship between input torques and output torques applied across a transmission assembly, in accordance with the present disclosure.

FIG. 7 schematically depicts an exemplary hybrid powertrain, illustrating input torques applied from an engine and an electric machine, illustrating relationship between input torques and output torques applied across a transmission assembly, in accordance with the present disclosure. Hybrid drive vehicles utilize an engine and at least one electric machine to accomplish providing power to the driveline of the vehicle and recovering energy to an energy storage device. FIG. 7 depicts vehicle 410 comprising engine 420, transmission 430, and electric machine 440. As depicted by the multi-directional arrows between the various elements and as described above, input torques from the engine and the electric machine and the output torque can be applied in either a forward or reverse direction, reflecting the above mentioned alternative functions that may be served within the hybrid powertrain. A hybrid control system, such as the hybrid control module described above, monitors the demanded vehicle speed and powertrain load requirements and manages the hybrid drive components to deliver the required output torque to meet the speed and load requirements while fulfilling the mentioned alternative functions according to a set of programmed priorities.

Figure 8:
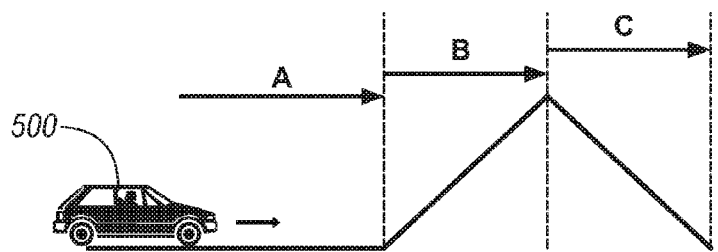
FIG. 8 illustrates an exemplary vehicle traveling along a route, demonstrating advantages possible by operating a hybrid powertrain according to available information concerning road conditions, in accordance with the present disclosure.

The methods disclosed herein are applicable to management of a hybrid powertrain. Likely vehicle speed and overall powertrain load predictions can be made available through analysis of electronic devices, as described above. On the basis of these predictions over a likely route of travel, an algorithm within the hybrid control system can select a hybrid control scheme for the route, selecting different hybrid configurations based upon likely vehicle speeds and powertrain loads and selected according to various operating priorities. FIG. 8 illustrates an exemplary vehicle traveling along a route, demonstrating advantages possible by operating a hybrid powertrain according to available information concerning road conditions, in accordance with the present disclosure. Vehicle 500 is traveling along a route comprising three sections: section A, a flat section; section B, an uphill section; and section C, a downhill section. An exemplary vehicle traveling along the pictured route without any information external to the vehicle will react according to inputs available from onboard sensors. For example, vehicle speed and powertrain load can be monitored for any instant in time, and known hybrid control systems modulate the operation of the engine and the electric machine to compensate for perceived conditions. Some exemplary known vehicles also use radar, vision systems, or other input generating sensors to predict the presence of an upcoming hill. However, the effectiveness of such systems are limited to line of sight, can be unreliable depending upon light, traffic, or other conditions, and are limited to simply adjusting the system for immediate anticipation of the hill. In the method disclosed, information related to the entire length of the route likely to be traveled can be utilized to plan usage of the hybrid drive components. For example, in relation to FIG. 8, vehicle 500 equipped with known sensors, would travel along section A, selecting a hybrid powertrain mode based upon the vehicle speed, powertrain load perceived, and other factors such as energy storage device state of charge. Upon sensing the upcoming transition to section B, vehicle 500, equipped with known sensors, would transition to a hybrid powertrain mode based upon the new vehicle speed, powertrain load perceived, and other factors. Finally, vehicle 500, equipped with known sensors, would transition to a hybrid powertrain mode based upon the new vehicle speed, powertrain load perceived, and other factors. By contrast, vehicle 500, equipped with an electronic device enabling the vehicle to monitor road conditions along the route, can analyze optional hybrid powertrain modes along each section, determine and balance factors associated with each mode, including fuel economy, emissions, drivability, and other concerns, and can select a coordinated series of modes to take advantage of the most preferable combination of modes to accomplish the route.

Figure 9:
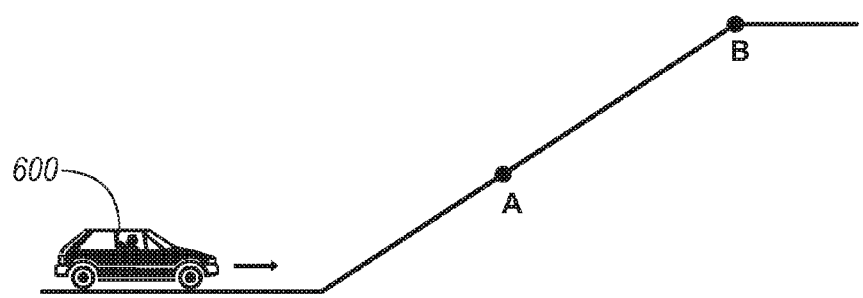
FIG. 9 illustrates an exemplary vehicle traveling along a route, demonstrating advantages possible by selecting engine operating modes within a hybrid control strategy according to available information concerning road conditions, in accordance with the present disclosure.

Additionally, the disclosed method can be utilized to select, within a hybrid control strategy, different engine operating modes based upon different possible demand torques that the hybrid control system might require of the engine. FIG. 9 illustrates an exemplary vehicle traveling along a route, demonstrating advantages possible by selecting engine operating modes within a hybrid control strategy according to available information concerning road conditions, in accordance with the present disclosure. Vehicle 600 is preparing to travel up a hill, and the hybrid control system is evaluating factors to determine the hybrid powertrain mode to utilize in traveling up the hill. Vehicle 600 equipped with known sensors, would travel up the hill, selecting a hybrid powertrain mode based upon the vehicle speed, powertrain load perceived, and other factors such as energy storage device state of charge. Frequently, the vehicle, sensing a demand for a high load, would select an engine mode capable of handling higher loads, for example a spark-ignition, stoichiometric fuel-air ratio mode. However, a vehicle equipped with an electronic device enabling the vehicle to monitor road conditions along the route can determine the length of the hill, determine optional, alternative hybrid powertrain control settings that could be selected, including the various engine operating modes that could be applied and the implications to total energy likely to be drained from the energy storage device, and adjust hybrid powertrain control to compensate. In the illustrated example of FIG. 9, vehicle 600 in perceiving a long hill, terminating at point B, might similarly select an engine mode capable of handling higher loads, such as the spark-ignition stoichiometric fuel-air ratio mode described above. However, if vehicle 600 perceives a short hill terminating at point A, might select an energy efficient engine operating mode, such as HCCI mode, in combination with a boosting operation of an electric machine, in order to meet the higher load demand of the hill. This determination, between one hybrid powertrain mode and another, can include, with added information made available through the disclosed methods, a balancing between various engine operating modes, including the implications to operating priorities implied with each, and depletion of energy from an energy storage device.

The examples of FIG. 8 and FIG. 9 demonstrate a number of uses for a hybrid control strategy that information regarding the environment around a vehicle might serve, both figures exemplifying the impact of a hill and the associated higher powertrain load demanded of the vehicle. However, one having ordinary skill in the art will appreciate that a number of environmental conditions identifiable through electronic devices, such as traffic patterns and speed limits, could equally be demonstrated with regard to impacts in vehicle speed and powertrain load. The disclosure, exemplifying the effects of a hill in the examples given, did so because of the illustrative nature and intuitive impact of a hill upon a vehicle, but the disclosure is not intended to be limited to such an exemplary condition.

Figure 10:
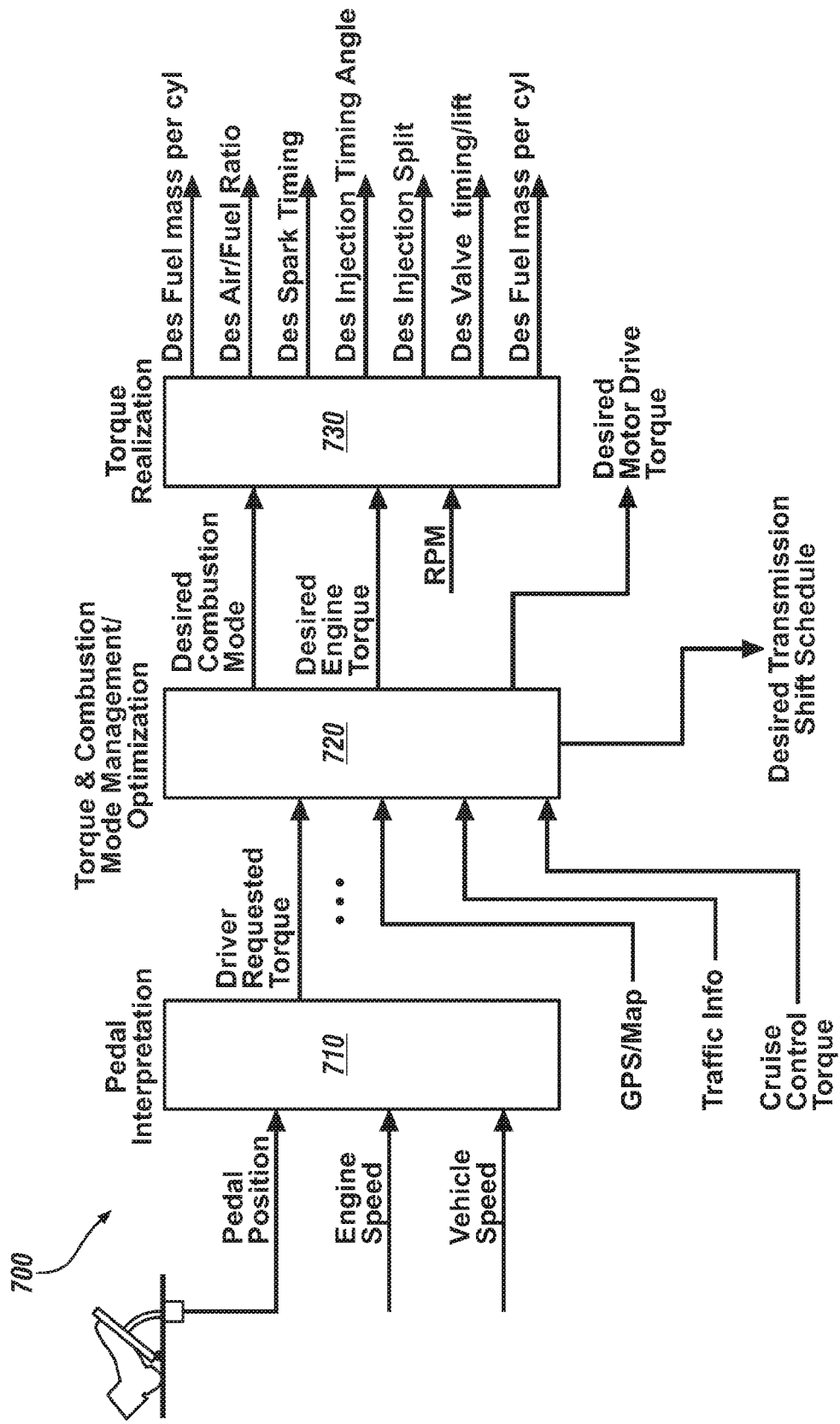
FIG. 10 depicts an exemplary information flow diagram, illustrating how map preview information can be used to control powertrain operation, in accordance with the present disclosure.

FIG. 10 depicts an exemplary information flow diagram, illustrating how map preview information can be used to control powertrain operation, in accordance with the present disclosure. Information flow 700 describes exemplary various data flows that can be incorporated, processed, and generated in order to control a vehicular powertrain. Node 710 includes pedal interpretation, processing pedal position in the context of engine speed and vehicle speed, in order to generate a driver requested torque or torque demand. At node 720, torque and combustion mode management and optimization logic processes the torque demand in light of GPS/digital map information, traffic information, and other related data. Node 720 further generates commands to the transmission and relates combustion mode and engine torque commands to node 730.

At node 730, the commands from node 720 are processed to create particular engine commands required to meet the demand torque according to the desired combustion mode. While information flow 700 illustrates an exemplary process by which the disclosed method can be processed, this information flow is given for illustrative purposes only. A wide variety of algorithmic embodiments of the disclosed method is envisioned, and the disclosure is not intended to limited to the specific embodiment described herein.

The disclosure has described certain preferred embodiments and modifications thereto. Further modifications and alterations may occur to others upon reading and understanding the specification. Therefore, it is intended that the disclosure not be limited to the particular embodiment(s) disclosed as the best mode contemplated for carrying out this disclosure, but that the disclosure will include all embodiments falling within the scope of the appended claims.

The invention claimed is:

1. Method of operating a vehicular powertrain including an internal combustion engine, comprising:
    monitoring map preview information;
    determining a projected vehicle path based upon said map preview information;
    determining likely engine operation demands along said projected vehicle path, wherein said likely engine operation demands includes likely required engine speeds and likely required engine loads;
    determining selectable engine operating modes at each likely engine operation demand; and
    executing engine operation based upon said selectable engine operating modes.

2. The method of claim 1, wherein said determining selectable engine operating modes includes determining whether said engine can operate in a homogeneous charge compression ignition mode and determining likely operating characteristics of said operation.

3. The method of claim 1, wherein said determining selectable engine operating modes includes determining whether said engine can operate in a pre-mixed charge compression ignition mode and determining likely operating characteristics of said operation.

4. The method of claim 1, wherein said determining selectable engine operating modes includes determining whether said engine can operate in a stratified charge spark ignition direct-injection mode and determining likely operating characteristics of said operation.

5. The method of claim 1, wherein said determining selectable engine operating modes includes determining whether said engine can operate in a hybrid powertrain electric machine boost mode and determining likely operating characteristics of said operation.

6. The method of claim 1, wherein said determining selectable engine operating modes includes determining whether said engine can operate in an active fuel management mode including deactivating combustion within a cylinder of said engine.

7. The method of claim 1, wherein said determining selectable engine operating modes includes determining whether said engine can operate in an emission control mode utilizing measures to reduce combustion temperatures.

8. The method of claim 1, further comprising determining a hybrid powertrain control strategy based upon map preview information; and
wherein said determining selectable engine operating modes includes integrating said selectable engine operating modes with said hybrid powertrain control strategy.

9. The method of claim 1, wherein said monitoring map preview information comprises monitoring static road features including at least one of road slope, road curvature, road surface type, road classification, posted speed limits, population density, and construction zone location.

10. The method of claim 1, wherein said monitoring map preview information comprises monitoring real-time conditions including at least one of traffic patterns including rush hour patterns or scheduled event traffic; reported traffic congestion including congestion information accessible through wireless networks, vehicle to vehicle communication or vehicle to infrastructure communications; and traffic signal status information.

11. The method of claim 1, wherein said monitoring map preview information comprises monitoring probabilistic data including probabilistic data related to at least one of traffic signal status, traffic congestion, and operator behavior.

12. The method of claim 1, wherein said executing engine operation based upon said selectable engine operating modes comprises balancing likely operating characteristics of the selectable engine operating modes including at least fuel efficiency and emissions.

13. The method of claim 1, wherein said monitoring map preview information comprises projecting a likely vehicle route of travel based upon at least one of a vehicle driving pattern, a specific operator driving pattern, a registered schedule, an electronic planner calendar, and a specifically designated destination.

14. The method of claim 13, wherein said executing engine operation based upon said selectable engine operating modes comprises balancing likely operating characteristics of the selectable engine operating modes throughout said likely vehicle route of travel.

15. The method of claim 14, wherein said balancing likely operating characteristics of the selectable engine operating modes includes evaluating operating characteristics including at least fuel efficiency and emissions.

16. The method of claim 15, wherein said balancing likely operating characteristics of the selectable engine operating modes further includes at least one of drivability and performance.

17. The method of claim 14, wherein said balancing likely operating characteristics of the selectable engine operating modes includes utilizing a certainty factor based upon analysis of said likely vehicle route of travel.

18. Method of operating a vehicular powertrain including an internal combustion engine, comprising:
monitoring map preview information;
determining a likely vehicle route of travel based upon said map preview information;
determining likely engine operation demands at periodic points along said likely vehicle route of travel, wherein said likely engine operation demands includes likely required engine speeds and likely required engine loads;
determining operating characteristics of selectable engine operating modes at each likely engine operation demand; and
formulating an engine control schedule by balancing said operating characteristics through said likely vehicle route of travel.

19. Method of operating a hybrid vehicular powertrain including an internal combustion engine, an electric machine, and an electromechanical transmission selectively operating to meet powertrain operation demands, comprising:
monitoring map preview information;
determining a likely vehicle route of travel based upon said map preview information;
determining likely powertrain operation demands along said likely vehicle route of travel, wherein said likely powertrain operation demands includes likely required powertrain speeds and likely required powertrain loads;
determining operating characteristics of selectable engine operating modes available along said likely vehicle route of travel;
balancing said operating characteristics of said selectable engine operating modes and potential energy utilization by said electric machine based upon said likely vehicle route of travel; and
formulating a hybrid powertrain control strategy based upon said balancing.

* * * * *